Oct. 18, 1966     R. J. SCHNEEBERGER     3,279,938
INFRARED TRANSMITTING OPTICAL FILTER HAVING POROUS
ANTIMONY TRISELENIDE LAYER
Filed Nov. 29, 1961

WITNESSES:

INVENTOR
Robert J. Schneeberger
BY
ATTORNEY

3,279,938
INFRARED TRANSMITTING OPTICAL FILTER HAVING POROUS ANTIMONY TRISELENIDE LAYER
Robert J. Schneeberger, Pittsburgh, Pa., assignor to Westinghouse Electric Corporation, East Pittsburgh, Pa., a corporation of Pennsylvania
Filed Nov. 29, 1961, Ser. No. 155,768
1 Claim. (Cl. 117—33.3)

This invention relates to optical filters and more particularly to filters having a porous layer of filtering material.

One area in which the present invention finds application is in the case of filters for use in the infrared spectrum. Conventional long wavelength-pass infrared filters (wavelengths up to 10 or 20 microns) are made from optical materials such as antimony trisulfide or antimony triselenide, glass, or germanium. Prior uses of these filter materials have been in the bulk form which necessitates that the materials be of a thickness in the order of several millimeters. Disadvantages of these materials used in this form include high losses due to reflections because of their high indexes of refraction, high transmission losses due to the relatively large optical path length, and displacement of non-normal incident rays which in some cases results in a degradation of image quality.

It is, therefore, an object of this invention to provide an improved optical filter.

A further object is to provide an improved optical filter for utilization in the infrared spectrum.

Another object is to provide an improved filter which is less reflective than prior known devices.

Another object is to provide an improved optical filter which is effective over a wide range of incident radiation.

A still further object is to provide an optical filter which utilizes a porous layer of filtering material.

Another object of this invention is to provide an optical filter having a very short optical path.

Stated briefly, the present invention discloses an optical filter comprising a supporting substrate upon which a porous layer or smoke deposit of filtering material is disposed. This porous layer is preferably deposited by vaporizing the filtering material onto the supporting substrate in an inert atmosphere.

Further objects and advantages of the invention will become apparent as the following description proceeds and features of novelty which characterize the invention will be pointed out particularly in the claims annexed to and forming a part of this specification.

Figure 1:
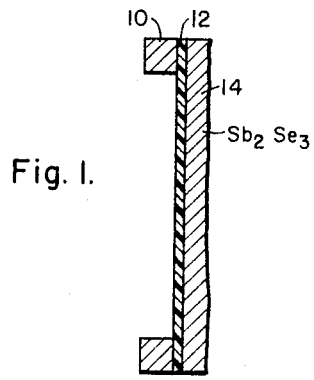
Figure 2:
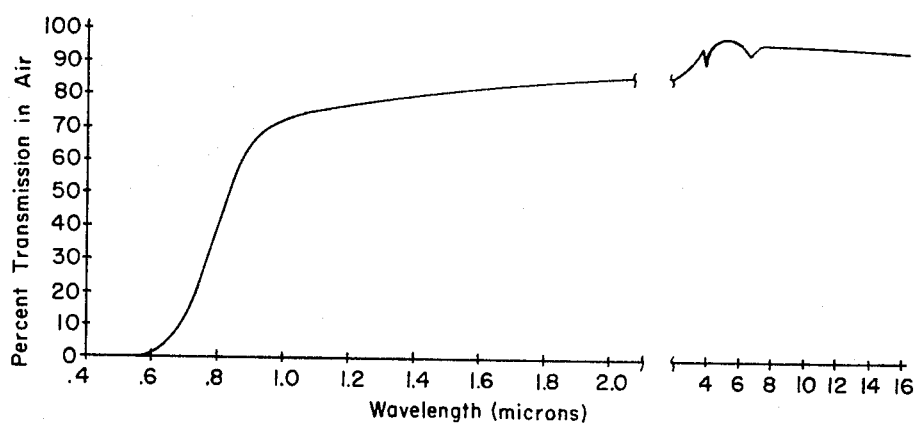

For a better understanding of the invention, reference may be had to the accompanying drawings in which:

FIGURE 1 is a side elevational view, in section, of a filter embodying the present invention; and FIG. 2 is a graphical representation showing the characteristics of transmission versus wavelength of the filter of FIG. 1.

With reference to FIG. 1 there is shown a specific embodiment of the present invention. The filter comprises a supporting ring 10 which is of any suitable material such as metal, wood or plastic and which is of sufficient size to supply the necessary mechanical strength. A supporting layer or substrate 12 is then placed onto the support ring 10. The substrate 12 is of any suitable material which is transmissive to radiation of the wavelength in which the filter is to be utilized and while the thickness of the substrate 12 is not critical it should be small by comparison to the wavelength of the radiation for which the filter is designed. In the present embodiment the substrate 12 is of polypropylene and has a thickness of approximately 3,000 Angstroms. A porous layer 14 of filter material is then deposited onto at least one surface of the substrate 12. The layer 14 is of a porous nature and may be termed a smoke deposit. Smoke deposit is herein defined as a deposit having a density less than the bulk density of the substance, that is, less than the normal density of the substance. In the specific embodiment illustrated, the layer 14 is comprised of antimony triselenide which has been deposited to a thickness of approximately 40 microns. The figure of 40 microns is not critical and the maximum thickness of the layer 14 is largely determined by the mechanical properties of the layer 14. It has been found that layers of antimony triselenide thicker than 40 microns have a tendency to break away from the substrate 12. If a thicker layer is desired, it is readily apparent that the substrate 12 may be coated on both sides rather than on just a single side.

The specific example of a filter as has been set forth above is one designed for use in the infrared spectrum. The transmission characteristic of the filter of FIG. 1 may best be explained with reference to FIG. 2 wherein there is shown a graphical representation by plotting the wavelength as the abscissa and the percent transmission in air as the ordinate. As is readily apparent from the graph, the intrinsic absorption of antimony triselenide occurs at a wavelength of approximately 0.7 micron. At wavelengths below this figure, the transmission rapidly decreases to zero so that no light in the visible spectrum is transmitted. At wavelengths greater than 0.7 micron, the transmission rises rapidly to approximately 95 percent of transmission in air and remains at this value.

That antimony triselenide in the smoke deposit form is vastly superior to this same material in the bulk form is evident from the following comparison. The reflection (R) per surface for normal rays is given by the equation:

$$R = \left(\frac{n-1}{n+1}\right)^2$$

where $n$ is equal to the index of refraction. If a piece of bulk antimony triselenide "glass" (two reflecting surfaces) were used, its transmission as compared to that in air at wavelengths greater than 0.7 micron could never be greater than 41 percent. Antimony triselenide has an index of refraction of approximately 4 and substituting this into the equation for R it is evident that the reflection per surface is 36 percent and hence the transmission per surface is 64 percent. As there are two reflecting surfaces, the total transmission of such a filter is equal to the product the transmission of each surface ($.64 \times .64$) or 41 percent. While it is possible to coat the surfaces with anti-reflecting layers, these layers are effective only in relatively narrow wavelength band and hence are restrictive on the band with over which a filter may be used. In addition, anti-reflecting coatings are effective only for rays which fall within a limited cone of angles. For example, extreme rays from a low $f$-number optical system would be largely reflected. On the other hand, antimony triselenide in the smoke deposit form, because of its extreme porosity, has an index of refraction only very slightly greater than unity. Thus, it is seen from the above equation that such a layer reflects only negligible amounts of incident radiation and is operable over a greater bandwidth than prior filters.

Polypropylene was chosen as a substrate in the preferred embodiment because of its excellent mechanical strength in very thin film form. While it is true that this material has strong absorption bands in wavelengths of 3.5 to 7.0 microns, because of the very short optical path (3,000 Angstroms) through the material, absorption in these regions is negligible. In the case of polypropylene, reflection (R) due to interference effects between the two surfaces of the thin film is given by the equation:

$$R = \left(\frac{n-1}{n+1}\right)^2 \times \left(\frac{\sin \phi}{\cos 1/2\phi}\right)^2$$

where $\phi = 4\pi n\sigma/\lambda_0$, $n$ = index of refraction, $\sigma$ = film thickness, and $\lambda_0$ = wavelength. For a polypropylene film as has been described, $n = 1.5$, $\sigma = 3,000$ Angstroms, and $\lambda_0 = 10$ microns. Substituting these figures into the above equation, it is found that the reflective R is only 0.013. Polypropylene, therefore, provides a mechanically strong and optically transparent layer for supporting a smoke layer of material possessing the desired absorption properties.

One method by which a filter, such as has been described above, may be made is as follows:

A suitable support ring 10, which may be of brass, is provided onto which layer 12 of polypropylene having a thickness of approximately 3,000 Angstroms is secured by the use of rubber cement. This structure is then placed into an inert atmosphere, for example helium under a suitable pressure, for example, 1.5 millimeters of mercury. Solid antimony triselenide is then heated to its vaporizing temperature and the free antimony triselenide molecules thus produced collide with the inert gas atoms and with themselves to produce a structure of particles which are carried by convection and are collected on the supporting substrate to the desired thickness. This process produces a smoke deposit on the polypropylene which has a density of about 1 percent of the bulk density of antimony triselenide. The density of the smoke deposit may be varied by varying the pressure of the insert atmosphere in which the coating process takes place. That is, an increase in the pressure results in a decrease in density of the deposit. As the decrease in density is due largely to an increase in deposit particle size, and as it is desirable that the particle size remain small, the density of the smoke deposit preferably does not exceed 10 percent of the bulk density of the material being deposited.

While there have been shown and described what is at present considered to be the preferred embodiment of the invention, modifications thereto will readily occur to those skilled in the art. For example, other materials which have been found suitable for the porous layer at the same or for other wavelengths include $As_2S_3$, $As_2Te_3$, $Sb_2S_3$, $As_{20}Se_{27}Te_3$ and $As_{20}Se_{16}Te_9$. Other materials which may be utilized as the supporting substrate include $Al_2O_3$ and polyethylene.

It is not desired, therefore, that the invention be limited to the specific arrangement shown and described and it is intended to cover in the appended claims all such modifications as fall within the true spirit and scope of the invention.

I claim as my invention:

A long wavelength-pass filter for the transmission of infrared radiation comprising a polypropylene support member approximately 3,000 Angstroms thick and a porous smoke deposit layer of antimony triselenide approximately 40 microns thick disposed on one face of said support member, said porous smoke deposit layer having a density of approximately one percent of the bulk density of antimony triselenide and an index of refraction only very slightly greater than unity.

References Cited by the Examiner

UNITED STATES PATENTS

| | | | |
|---|---|---|---|
| 2,512,257 | 6/1950 | Pfund | 88—57 |
| 2,744,837 | 5/1956 | Forgue | 117—106 X |
| 2,829,074 | 4/1958 | Lubszynski | 117—106 X |
| 2,910,602 | 10/1959 | Lubszynski et al. | 313—65 |
| 2,932,592 | 4/1960 | Cameron | 117—211 |
| 3,020,432 | 2/1962 | Nicholson | 117—211 X |
| 3,020,442 | 2/1962 | Nicholson et al. | 117—211 X |

FOREIGN PATENTS 820,240  9/1959  Great Britain.

OTHER REFERENCES

Barnes et al.: "Filters for the Infrared," article in "Journal of the Optical Society of America," vol. 26, December 1936, pp. 428–433 cited.

Black et al.: Article in Journal of the Physics and Chemistry of Solids, vol. 2, No. 3, 1957, pp. 240–251 cited.

Pfund: "The Optical Properties of Metallic and Crystalline Powders," article in "Journal of the Optical Society of America," vol. 23, October 1933, pp. 375–378 cited.

DAVID H. RUBIN, *Primary Examiner.*